July 19, 1960 B. E. BALDWIN 2,945,314
DISPLAY DEVICE
Filed Oct. 17, 1957

INVENTOR
BRIAN E. BALDWIN
by Mason, Kolehmainen, Rathburn and Wyss
ATTORNEYS.

United States Patent Office

2,945,314
Patented July 19, 1960

2,945,314
DISPLAY DEVICE
Brian E. Baldwin, 2952 Central St., Evanston, Ill.

Filed Oct. 17, 1957, Ser. No. 690,645

3 Claims. (Cl. 40—324)

The present invention relates to a display device and, more particularly, to a novelty shot glass device which displays advertising or the like matter and which magnifies a picture or the like supported within the device.

It is an object of the present invention to provide a display device having a cup and a cup support provided with a transparent wall, means on which is displayed advertising or the like matter being located adjacent to the wall for viewing from outside of the container.

It is another object in accordance with the previous object to provide advertising means having elastic properties which causes the means to conformably engage the inner surface of the wall.

It is a further object of the present invention to provide a display device having a cup including a lens in its bottom and a unitary cup support including a wall and a transparent window located adjacent to a recess in which a picture is disposed for viewing through the lens from above the container.

It is another object in accordance with the previous object to provide a transparent wall having its inner surface frosted to prevent viewing of the picture through the wall.

It is yet another object of the present invention to provide magnification means at the bottom of a liquid containing cup for viewing a picture supported from the base of a cup support, the support including a transparent wall through which advertising or the like matter displayed on a sleeve is viewed.

It is a further object of the present invention to provide a display device having a false bottom provided with a lens means for viewing a picture object located at the base of the container, the container having a lower transparent wall through which is viewed display matter disposed on a sleeve located adjacent to the transparent wall, either the picture or the sleeve having light transmission characteristics and the other having light obstruction characteristics.

It is a further object of the present invention to provide a display device having a cup provided with a lens for viewing a photograph supported from the base of a cup support, the cup support having a transparent wall to permit viewing of advertising matter displayed on a sleeve located within the cup support and having light transmission qualities, whereby the photograph is illuminated by the light passing through the wall and the sleeve.

It is yet another object of the present invention to provide a display device having a liquid containing cup provided with a lens for viewing a transparency located adjacent to a transparent window defined in the base of a cup support, the cup support having a transparent wall to permit viewing of advertising or the like matter disposed on a sleeve located adjacent to the transparent wall and having light obstructing qualities, whereby the light admitted through the transparent window illuminates the transparency without interference from light passing through the transparent wall.

It is a further object of the present invention to provide a display device having a liquid containing cup and a supporting cup adapted to engage said liquid containing cup to support same from a flat surface, the cups being so dimensioned that one of the cups is adapted to be nested within the other for facile shipment and storage.

The above and other objects are achieved in accordance with the present invention by providing a display device having a liquid containing cup including a wall defining a generally cylindrical configuration and having a cup-like support including a wall defining a generally cylindrical configuration, the cup and cup-like support being engageable to provide a device having a continuous generally cylindrical wall. The bottom of the cup is provided with a lens and adjacent annular shoulder for accommodating the upper end of the wall of the cup-like support. The wall of the cup support extends upwardly from a shelf defined on a base and includes a wall having a frosted inside surface which diffuses light passing therethrough and transforms the transparent wall into a translucent wall. With the cup and the cup support in engagement, the bottom of the liquid containing cup is located generally equidistant the top and bottom of the device such that the lens magnifies a picture located in a recess defined centrally of the shelf in the base of the cup support, the recess being disposed immediately adjacent to a transparent window through which light is adapted to be transmitted. The shelf functions to support a sleeve immediately adjacent to the wall so that advertising or the like matter disposed on the sleeve is viewable through the wall. The sleeve, made from flat material, is curled for disposition adjacent to the transparent wall, and due to the elasticity of the material the sleeve is pressed against the frosted surface of the wall whereby the light diffusion action of the frosted surface is substantially rendered ineffective and the advertising matter is easily and clearly viewed.

It will be appreciated that great flexibility is obtainable with the display device since any desired pictures may be viewed from above the device and any designated advertising or identification matter may be disposed on the sleeve and viewed from the side of the device. Moreover, inasmuch as the picture may comprise either a photograph having light obstructing qualities or a transparency having light transmission qualities, the sleeve may be made from stock having either light transmission or obstructing qualities. In this connection, if a transparency which has light transmission qualities is used, then a sleeve having light obstructing qualities is employed with the result that light passing through the transparent wall is blocked by the sleeve and is prevented from falling on the transparency whereby the transparency is normally illuminated by the light passing through the transparent window in the base and is easily viewed through the lens from above the device. On the other hand, if a photograph which has light obstructing characteristics is used, then a sleeve having light transmission characteristics is employed, whereby light passing through the transparent window is obstructed by the photograph and the light passing through the transparent wall is admitted through the sleeve to illuminate the photograph for facile viewing through the lens from above the device. Furthermore, since the inside surface of the transparent wall is frosted, a photograph may be used without a sleeve whereby the photograph may be illuminated by light passing through the wall but may not be viewed from outside of the device.

The invention both as to its organization and method of operation, together with further objects and advantages thereof, will best be understood by reference to the following description, taken in connection with the accompanying drawings in which.

Figure 1:
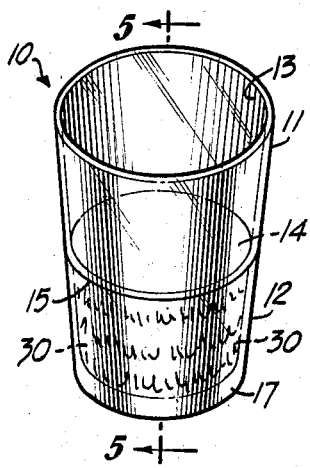
Fig. 1 is a perspective view of a display device embodying the features of the present invention.
Figure 6:
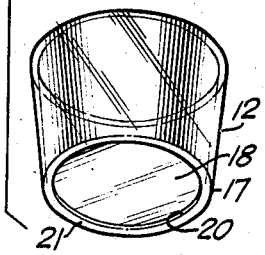
Fig. 6 is a reduced sectional view taken along line 6—6, assuming that the entire structure is shown in Fig. 5.
Figure 5:
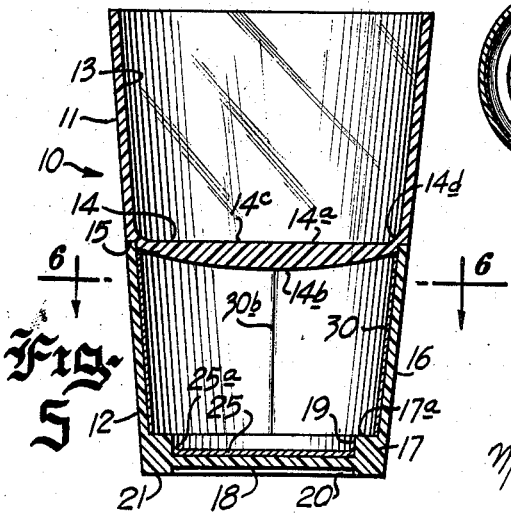
Fig. 5 is an enlarged sectional view taken along line 5—5 of Fig. 1.
Figure 7:
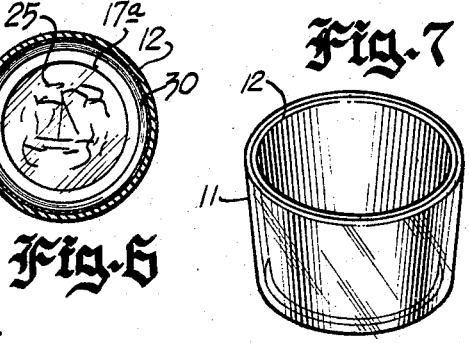
Fig. 7 is a perspective view illustrating the two piece display device in disassembled nested relationship for shipment and storage.

Referring now to the drawings, and particularly to Figs. 1, 5 and 6, there is illustrated a display device 10 having an upper receptacle or cup 11 adapted to contain a material and a lower unitary support 12. The display device 10 may be of any size and may serve a multitude of purposes, but preferably it functions as a shot glass for containing one or two ounces of liquid, after which the shot glass may be retained by the customer as a souvenir. Specifically, the cup 13 is made from a plastic or the like material in a single mold, but preferably is made from a clear transparent plastic to permit viewing of the liquid through the walls of the cup. The liquid containing cup 11 includes a frusto-conical wall 13 extending upwardly from a bottom 14 which has an upper planar surface 14a and a lower convex surface 14b. The plano-convex bottom of the receptacle thereby provides a lens 14c which magnifies a picture supported from the base of the unitary support 12, as described hereinafter. The diameter of the lens 14c is less than the diameter of the bottom 14 or the lower end of the wall 13, thereby to define an annular shoulder 15 adjacent to the edge of the lens for accommodating the upper end of the wall 16 of the support 12. The width of the shoulder 15 is equal to the thickness of wall 16 while the diameter of the lens edge is slightly less than the inside diameter of the upper end of the wall 16, such that the wall 16 and the lens 14c slidably and snugly engage and the upper end of the wall seats against the shoulder 15. In assembly of the cup 11 and the support 12, a designated quantity of adhesive or plastic solvent is applied between wall 16 and the bottom 14 to fixedly secure the cup 11 and support 12 together.

Considering now the support 12, as best shown in Figs. 5 and 6, it includes, similar to the cup 11, a frusto-conical wall 16 extending upwardly from a base 17, the support being made from a transparent or clear plastic in a single mold as a unitary piece. A window 18 is provided centrally of the base 17 and its upper surface is defined by a recess 19 opening inwardly of the support 12 and its lower surface is defined by a recess 20 opening downwardly of the support 12. Located between the lower end of the inner surface of the wall 16 and the recess 19 is an annular ledge 17a extending entirely around the base 17 immediately adjacent to the wall 16. The recess 20 defines an annular ridge 21 which is adapted to engage a flat surface for supporting the display device 10 in any upright position. The inner surface of the wall 16, the upper surface of the ledge 17a and the inner surface of the vertical wall of the recess 19 are frosted as a result of the molding operation inasmuch as the portion of the mold adjacent to the above surfaces is provided with a surface roughness which imparts to the above support surfaces a similar roughness or unevenness. By this construction, there is provided translucent inner surfaces on the wall 16 and on part of the base 17, whereby light passing therethrough is diffused and viewing of the inside of the support 12 is prevented. It will be appreciated, however, that light is transmitted through the translucent surfaces so that the inside of the support 12 is illuminated.

Figure 2:
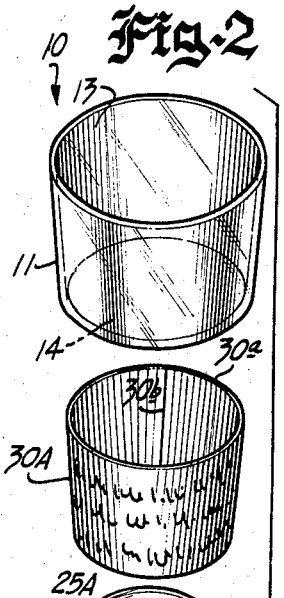
Fig. 2 is an exploded perspective view of the display device of Fig. 1 embodying a sleeve having light obstructing qualities and a picture having light transmission qualities.
Figure 3:
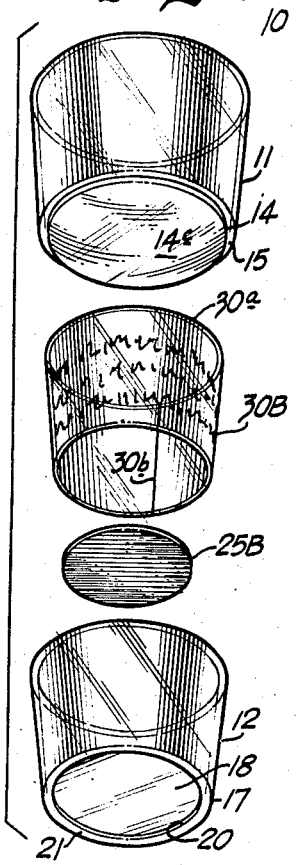
Fig. 3 is an exploded perspective view of the display device of Fig. 1 embodying a sleeve having light transmission qualities and a picture having light obstructing qualities.

A display object or picture 25, which may comprise either a photograph 25A, as shown in Fig. 2, or a transparency 25B as shown in Fig. 3, is employed and is circular in shape to be press fitted into the recess 19 so that it may be viewed in magnified form through the lens 14c from above the device 10. As is well known, the photograph 25A is produced on photographic paper which has light obstructing qualities and may depict a landscape scene, a portrait, or printed or written information. This photograph is viewable only when light impinges on the processed surface or face of the photograph. On the other hand, the transparency 25B is produced on either a positive or negative type of film which has light transmission qualities and, similar to the photograph, may depict a landscape scene, a portrait, or printed or written information. The transparency is clearly viewable when light falls on one side of the transparency and the viewer is on the other side of the transparency. The diameter of the picture 25 is slightly larger than the diameter of the recess 19 so that the peripheral edge 25a of the picture is curled upwardly incident to press fitting of the picture 25 into the recess 19 by a suitable tool. The edge 25a, therefore, fixedly retains the picture 25 in the base 17 of the display device and, specifically seats the picture at the bottom of the recess 19 adjacent to the transparent window 18. By this construction, the use of adhesive material, which would tend to mar or distort the picture is entirely obviated. Moreover, by virtue of using a unitary support 12, the use of a two piece support member adapted to frictionally engage and position a picture is likewise avoided.

Figure 4:
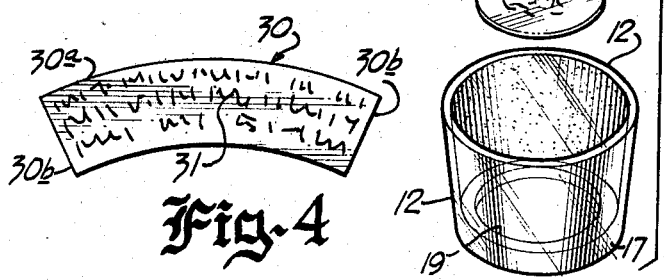
Fig. 4 is a view of the sleeve in flattened condition after fabrication from flat stock and before disposition within the device of Fig. 1.

In accordance with an aspect of the present invention, a sleeve 30 having a frusto-conical configuration is seated on the ledge 17a to be in flush engagement with the inner surface of the wall 16. This sleeve 30 is stamped or punched out of flat sheet material having either light transmission qualities or light obstruction qualities and after being formed has a pair of longitudinal arcuate edges 30a and a pair of inclined ends 30b, as best shown in Fig. 4. The sleeve 30, being cut to predetermined dimensions, is curled into a frusto-conical shape and disposed with its shorter edge 30a on the ledge 17a so that the entire sleeve 30 is adjacent to the inner surface of the wall 16 before assembly of the cup 11 and support 12. With this arrangement, the ends 30b of the sleeve abut against one another to provide a generally continuous sleeve adjacent to the wall 16, the height of the sleeve 30 being approximately equal to the distance between the ledge 17a and the bottom of the lens 14c adjacent to the shoulder 15. The material from which the sleeve is cut has an elastic quality which tends to flatten the sleeve when curled within the support. Accordingly, the inherent elasticity of the sleeve material induces the sleeve to conform to and to be in flush relation with the frosted inner surface of the wall 16, thereby to permit clear viewing of the sleeve 30 from outside of the support 12. It will be appreciated that advertising, identification, or the like information, for example, the name of the establishment serving liquid in the display device, is disposed on the sleeve in any fanciful and arbitrary manner, as shown at 31. Although the inner surface of the wall 16 is frosted, the disposition of the sleeve 16 immediately adjacent to the wall substantially reduces the light diffusing action of the frosted surface with the result that clear viewing of the information of the sleeve from without the display device 10 is possible. However, if the sleeve is spaced from the frosted surface, then the viewing of the information would be substantially impaired by the frosted surface of the wall 16.

When viewing the transparency 25B through the lens 14c, it is desirable that light be applied from behind the transparency or, more specifically, that light be available beneath the bottom of the display device for passage through the window 18 to illuminate the under surface of the transparency. It is further desirable that only a restricted amount of light impinge upon the upper surface of the transparency 25B, i.e., the side of the transparency facing the lens, or more particularly, that no light be admitted through the wall 16. Accordingly, when a transparency 25B is disposed in the recess 19, a sleeve 30B made from material which has light obstructing qualities, yet which permits advertising matter to be displayed thereon, is used as shown in Fig. 3. The sleeve 30B blocks the passage of light transmitted through the wall 13, while the frosted upper surfaces of the ledge 17a and vertical walls of the recess 19 pass a limited amount of light into the support 12. Thus, the transparency 25B when viewed through the lens 14c from above the display device 10 is properly illuminated and has the proper clarity and definition.

On the other hand, it will be appreciated that when the photograph 25A having light obstructing qualities is disposed in the recess 19, it is desirable that light impinge on the processed side of the photograph 25A and, accordingly, that light pass through the wall 16 into the inside of the support 12. Therefore, when a photograph 25A is located in the recess 19, a sleeve 30A made from a material which readily transmits light, yet which is readily susceptible to having advertising matter or the like disposed thereon, is employed. By this arrangement, no light is admitted upwardly through the window 18 because of the presence of the photograph in the recess 19, and an adequate amount of light is admitted through the wall 16 and the sleeve 30A to properly illuminate the photograph for viewing through the lens 14c from above the display device.

Furthermore, since the inner surface of the wall 16 is frosted, no sleeve of any kind need be used when a photograph 25A is located in the recess 19. In this case, a viewer is unable to observe the photograph 25A through the wall 16 because of its frosted inner surface and thus must view the photograph 25A through the lens 14c. However, an adequate amount of light passes through the wall 16 to illuminate the photograph 25A, it being understood that no light is transmitted upwardly through the bottom on the photograph 25A because of the inherent light obstructing qualities of conventional photographic paper.

It will thus be appreciated that in accordance with the various features of the present invention there has been provided a display device having great flexibility which permits different types of pictures and advertising matter to be viewed simultaneously. The purchaser of the display device 10 has a wide latitude in the selection of the specific type and style of advertising material displayed on the sleeve 30, the particular type of picture 25, the degree of light transmissibility of the sleeve 30, and the degree of light transmissibility of the picture 25. Furthermore, the display device 10 is conducive to mass production and assembly line techniques, since each order may be filled by simply assembling designated pictures and sleeves in accordance with the preference of the purchaser. In addition, substitutions or changes in the desired product can be readily and easily effected without permanently damaging the display device.

Although it is contemplated that the display device 10 be sold as a single product, as illustrated in Fig. 1, it is envisioned that the display device also be sold in kit form. To this end, the cup 11 and support 12 would not be assembled during manufacture but would be packaged without being secured together. The kit materials could include a plurality of different types of sleeves 30 and/or a plurality of different types of pictures 25 or, alternatively, additional materials could be included so that the customer could imprint has name or other words on the sleeve 30. Moreover, it will be understood that a photograph or transparency which the customer himself had taken or purchased could be used.

In the interest of conserving space during shipment and storage, the cup 11 and support 12 are so dimensioned as to permit the support 12 to be nested within the cup 11. If the walls 13 and 16 are spaced apart when the cup 11 and support 12 are nested, then the base 17 engages the bottom 14 with the result that the lens 14c may be scratched by the ridge 21 during handling or shipment. To prevent the marring or scratching of the lens 14c, the walls 13 and 16 are so dimensioned that the base 17 engages an upwardly curved portion 14d of the bottom 14, thereby to space the base 17 from the lens 14c. As an alternative, the walls 13 and 16 may be constructed to be in sliding engagement when the ridge 21 rests on the portion 14d with the result that a frictional force is developed to prevent disassembly of the parts when the nested cup and support are turned sidewardly or upside down. If the bottom 17 is made without the upturned portion 14d and the surface 14a angularly meets the wall 13, the walls 13 and 16 may be so dimensioned that during disposition of the support 12 within the cup 11 sliding engagement is effected between the walls 13 and 16 prior to engagement of the base 17 with the bottom 14. By this construction the base 17 is also spaced from the bottom 14 and the lens 14c is protected from the marring action of the ridge 21.

While there have been described several embodiments of the present invention, it will readily be understood that numerous changes and modifications may be made which will readily occur to those skilled in the art. It is aimed in the appended claims to cover all such changes and modifications as fall within the true spirit and scope of the present invention.

What is claimed as new and desired to be secured by Letters Patent of the United States is:

1. A display device comprising a receptacle for material including a lens means defined in its bottom, a support for supporting said receptacle and including a transparent base and an upstanding wall which transmits light, an object member to be viewed supported from said case for viewing through said lens means from above the display device, and a sleeve member on which advertising or the like material is displayed supported on said base adjacent to the inner surface of said wall for viewing through the wall of said support, one of said members transmitting light and the other of said members substantially obstructing light, whereby said sleeve member facilitates the viewing of said object member through said lens means.

2. The display device of claim 1 wherein said object member comprises a transparency which is viewable when positioned between a viewer and a light source and wherein said sleeve member comprises a material which substantially obstructs the passage of light therethrough, whereby no light is admitted through the wall of said support to illuminate the transparency and the light admitted through the transparent base is used to illuminate the transparency.

3. A display device comprising a cup for housing a liquid, said cup having a bottom provided with a lens means, a support of cup-like shape for supporting said cup from a flat surface, said support having a wall which transmits light and extending upwardly from a base, a photograph supported by said base for viewing from above the device through the lens means, and a sleeve of transparent material which transmits light and is supported by said base adjacent to the wall and on which advertising or the like matter is displayed, said sleeve permitting light to pass therethrough in order to illuminate the photograph supported by said base.

References Cited in the file of this patent

UNITED STATES PATENTS

| | | |
|---|---|---|
| 531,924 | Gibson | Jan. 1, 1895 |
| 777,305 | Priestnall | Dec. 13, 1904 |
| 1,469,036 | Davison | Sept. 25, 1923 |
| 1,508,523 | Naterman | Sept. 16, 1924 |
| 1,561,730 | Kodama | Nov. 17, 1925 |
| 2,521,558 | Alvarez | Sept. 5, 1950 |
| 2,715,326 | Gits | Aug. 16, 1955 |

FOREIGN PATENTS

| | | |
|---|---|---|
| 14,455 | Great Britain | Sept. 13, 1889 |